United States Patent
Nakagome

(10) Patent No.: US 6,951,899 B2
(45) Date of Patent: Oct. 4, 2005

(54) BLEND COMPOSITIONS OF HARD AND SOFT CROSSLINKABLE ACRYLATE COPOLYMERS

(75) Inventor: Seiji Nakagome, Tsuchiura (JP)

(73) Assignee: NOK Corporation, Tokyo (JP)

( * ) Notice: Subject to any disclaimer, the term of this patent is extended or adjusted under 35 U.S.C. 154(b) by 50 days.

(21) Appl. No.: 10/384,373

(22) Filed: Mar. 10, 2003

(65) Prior Publication Data

US 2003/0220440 A1 Nov. 27, 2003

Related U.S. Application Data

(60) Continuation of application No. 09/910,050, filed on Jul. 23, 2001, now abandoned, which is a division of application No. 09/199,386, filed on Nov. 25, 1998, now abandoned.

(30) Foreign Application Priority Data

Nov. 26, 1997 (JP) .............................................. 9-340680

(51) Int. Cl.$^7$ ................................................. C08J 3/00
(52) U.S. Cl. ...................... 524/501; 524/522; 524/525; 525/221; 525/223; 525/228
(58) Field of Search ................................. 524/501, 522, 524/525; 525/223, 228, 221

(56) References Cited

U.S. PATENT DOCUMENTS

| | | | |
|---|---|---|---|
| 3,793,402 A | * | 2/1974 | Owens ......................... 525/81 |
| 3,808,180 A | * | 4/1974 | Owens ......................... 525/287 |
| 4,052,525 A | * | 10/1977 | Ide et al. .................... 428/412 |
| 4,195,134 A | * | 3/1980 | Coleman .................... 524/605 |

OTHER PUBLICATIONS

Abstract of Japanese Pub. No. 63–218752, published Sep. 12, 1988, Shigeru (Nippon Zeon Co. Ltd.), 2 pages.
Abstract of Japanese Pub. No. 04–216852, published Aug. 6, 1992, Yukihiro et al (Japan Synthetic Rubber Co. Ltd.), 2 pages.
Abstract of Japanese Pub. No. 05–214196, published Aug. 24, 1993, Yukihiro et al (Japan Synthetic Rubber Co. Ltd.), 2 pages.
Abstract of Japanese Pub. No. 02–300204, published Dec. 12, 1990, Masayuki et al (Japan Synthetic Rubber Co. Ltd.), 2 pages.
Abstract of Japanese Pub. No. 02–300203, published Dec. 12, 1990, Masayuki et al (Japan Synthetic Rubber Co. Ltd.), 2 pages.

* cited by examiner

Primary Examiner—Tatyana Zalukaeva
(74) Attorney, Agent, or Firm—Jacobson Holman PLLC

(57) ABSTRACT

To provide a method for producing a blend composition of an acrylic type polymer having an excellent mechanical characteristic as well as a low temperature characteristic, and to provide a blend composition of an acrylic type polymer, and also to provide a blend composition of an acrylic type polymer for sealing materials having an excellent abrasion resistance which is important for sealing materials.

To prepare a blend composition of an acrylic type polymer by co-precipitation after mixing (A) an aqueous latex of a copolymer—showing about −10° C. to −65° C. of a glass transition temperature Tg—obtained by emulsion polymerization or suspension polymerization of at least one of an acrylic ester and methacrylic ester with a vinyl monomer containing crosslinking group with (B) an aqueous latex of copolymer—showing about 0° C. of a glass transition temperature Tg or a softening point—obtained by emulsion polymerization or suspension polymerization of at least one of an acrylic ester and methacrylic ester with a vinyl monomer having crosslinking group.

20 Claims, No Drawings

BLEND COMPOSITIONS OF HARD AND SOFT CROSSLINKABLE ACRYLATE COPOLYMERS

This is a Continuation of application Ser. No. 09/910,050 filed Jul. 23, 2001 now abandoned, which in turn is a Divisional of application Ser. No. 09/199,386 filed Nov. 25, 1998, now abandoned.

BACKGROUND OF THE INVENTION

1. Field of the Invention

The present invention relates to a blend composition of acrylic and/or methacrylic polymers and a process for producing the blend composition of acrylic and/or methacrylic polymers, and more particularly to a blend composition of acrylic and/or methacrylic polymers having an excellent mechanical properties and low temperature characteristics, and a process for producing the blend composition by co-precipitation of at least two kind of latices containing acrylic and/or methacrylic polymers. The present invention also relates to a blend composition of polymers, having an excellent antiabrasion properties, which can be suitably used for sealing materials.

2. Related Arts

An acrylic type polymer is superior in heat-resistant and oil-proof properties, however, inferior in mechanical characteristic properties particularly of tear strength and toughness (energy at tensile) resulting in limited use. Improvements of the mechanical characteristics of an acrylic type polymer have been attempted by selecting a curatives and an additives (Japanese Patent Laid-Open No. 1988-218752, Japanese Patent Laid-Open No. 1992-216852, and Japanese Patent Laid-Open No. 1993-214196, etc.). However, mechanical characteristics of acrylic type polymers which is comparable to those of other rubber materials has not yet been currently accomplished so far.

Blending acrylic type polymers with such polymers as NBR or hydrogenated NBR has been so far tried to improve its mechanical properties of the acrylic type polymers. However, blending with different materials causes not only problem arised from wetting (or affinity) at interface between acrylic type polymer and other materials resulting in technically difficult in dispersion, but also new problems such as deterioration in heat resistance and properties in a low temperature and cost rise. In addition, conventional blending of acrylic polymer with a resin causes problems of not only dispersion, but also decrease in compression set characteristics that is an important characteristics of rubber materials.

SUMMARY OF THE INVENTION

It is the object of the present invention to provide a blend composition of acrylic and/or methacrylic polymers and to provide a process for producing the blend composition of the acrylic and/or methacrylic polymers having an excellent mechanical characteristics and low temperature characteristics. Another object of the present invention is to provide a sealing materials which has a good abrasion resistance and can be suitably used for oil seals or the like.

The object of the present invention is achieved by producing a blend composition of acrylic and/or methacrylic polymers by co-precipitation after mixing an aqueous latex of a copolymer (A)—showing about −10° C. to −65° C. of a glass transition temperature Tg—obtained by emulsion polymerization or suspension polymerization of at least one kind of monomer selected from the group of an acrylic ester and methacrylic ester and a vinyl monomer containing crosslinking group, with an aqueous latex of copolymer (B)—showing about 0° C. of a glass transition temperature Tg or a softening point—obtained by emulsion polymerization or suspension polymerization of at least one kind of monomer selected from the group of an acrylic ester and methacrylic ester and a vinyl monomer containing crosslinking group.

DETAILED DESCRIPTION OF THE INVENTION

The aqueous latex of a copolymer of (A) component is obtained by emulsion polymerization or suspension polymerization of at least one kind of monomer selected from an acrylic ester and methacrylic ester with a vinyl monomer containing crosslinking group.

For the acrylic ester and methacrylic ester, an alkyl ester with carbon number of 1–8 or alkoxyalkyl ester with carbon number of 2–8 is generally used; for example, at least one kind of monomer selected from the group of acrylic esters such as methyl acrylate, ethyl acrylate, n-butyl acrylate, 2-ethylhexyl acrylate, 2-methoxyethylacrylate, 2-ethoxyethylacrylate, and methacrylic esters corresponding to the above mentioned acrylic esters are used. Preferably at least one kind of monomer selected from the group of ethyl acrylate, n-butyl acrylate, and 2-methoxyethylacrylate is used. Particularly, when not less than about 30 percent by weight based on the total amount of monomer composition in the copolymer, preferably about 50–99 percent by weight of ethyl acrylate or n-butyl acrylate is used as a monomer for copolymer of the (A) component, better heat resistance as well as better mechanical properties can be obtained. Thus, each kind of these monomers can be used in line with the demand for the level of the low temperature characteristics and/or mechanical properties.

The vinyl monomer having a crosslinking group copolymerized with these acrylic or methacrylic esters is preferably exemplified by vinyl monomer containing a reactive halogen group or a monomer containing an epoxy group. These crosslinking groups are used to crosslink with the aid of the following crosslinking agent.

(1) Vinyl Monomers Containing a Reactive Halogen Group 2-chloroethylvinyl ether, vinyl chloroacetic acid, vinyl α-chloropropionic acid, aryl chloroacetic acid, chloroethyl acrylate, chloromethyl styrene or the like.

These copolymers are crossslinked by a crosslinking agent such as polyamines or the like, diethylenetriamine, polycarbamate or the like.

(2) Vinyl Monomers Containing Epoxy Group

Vinylglycidyl ether, arylglycidyl ether, glycidyl acrylate, glycidyl methacrylate or the like.

These copolymers are cross linked by polyamine such as diethylene triamine, m-phenylene diamine or the like, polycarboxylic acids such as adipic acid or the like, acid anhydrides such as phthalic anhydride, maleic acid anhydride or the like, polyamide, sulfonamide or the like.

(3) Vinyl Monomers Containing Carboxylic Group

Acrylic acid, methacrylic acid, maleic acid, crotonic acid, itaconic acid, cinnamic acid, monoethyl maleate, monobutyl maleate, monoethylfumarate, etc.

These copolymers are cross linked by polyepoxide such as ethylene glycol diglycidyl ether, 1,4-butane diol, 1,1,1-trimethylol propane or the like.

(4) Vinyl Monomers Containing Hydroxyl Group

Hydroxyalkyl acrylate, hydroxyalkyl methacrylate, hydroxyalcoxyacrylate, N-methylol acrylamide or the like These copolymers are crosslinked by polyisocyanate such as hexamethylene diisocyanate or trimers thereof, polycarboxylic acids such as adipic acid or the like, or alcoxy methylmelamine such as methoxy methylmelamine or the like.

(5) Vinyl Monomers Containing an Amide Group

Acrylamide, methacrylamide or the like

These copolymers are crosslinked by aminoformaldehyde, hexamethylenediisocyanate or trimers thereof or the like.

At least about 60–99 percent by weight based on the total amount of monomers in the copolymer, preferably about 70–99 percent by weight of acrylic or methacrylic ester monomers, and about 0.1–10 percent by weight based on the total amount of monomers in the copolymer, preferably about 0.2–5 percent by weight of vinyl monomers containing crosslinking group can be used for copolymerization reaction. Other vinyl monomers or olefin monomers such as styrene, α-methyl styrene, acrylonitrile, methacrylonitrile, acrylamide, vinyl acetate, ethylene, propylene or the like can be further used in the copolymer within a range that these monomers do not cause deterioration in characteristics of copolymers—generally not more than about 40 percent by weight based on the total amount of monomer composition in the copolymer, preferably about 0.5–30 percent by weight.

The copolymerization reaction is carried out by emulsion polymerization or suspension polymerization in the presence of an intiator generally used for radical polymerization. Initiator for radical polymerization can be also used as a redox polymerization system. The polymerization reaction is carried out by a method such as a batch system or continuous or intermittent adding system in the presence of anionic surfactant such as sodium lauryl sulfate, sodium dodecylbenzene sulfonate, sodium dialkyl sulfosuccinate, ammonium salt of polyoxyethylene alkylphenylether sulfate or the like, or nonionic surface active agents such as polyoxyethylene nonylphenylether, polyethylene glycol monostearate, sorbitan monostearate or the like, and at a temperature of about –10–100° C., preferably at about 2–80° C., up to about 90% or more, preferably about 95–99.8% conversion ratio of polymerization. Thus, the monomer ratio in the copolymer is approximately equal to the monomer ratio which is used in the polymerization process.

The thus obtained aqueous latex contains the copolymer (A) with a solid concentration of about 25–50 percent by weight and the copolymer itself shows a glass transition temperature Tg of about –10—65° C., preferably about –20—60° C.

The copolymer having such Tg can be arbitrarily prepared by adjusting the monomer ratio in the copolymer. The Tg of a copolymer obtained is easily predicted by calculation based on Tg values of individual homopolymers and their monomer ratio in the copolymer. Substantially, copolymers made from an acrylic ester monomer and a vinyl monomer containing a crosslinking group are preferably used. Methacrylic ester monomer can also be copolymerized together if the Tg value falls in the designated range.

On the other hand, aqueous latex of the (B) component is obtained by emulsion polymerization or suspension polymerization of at least one of acrylic ester or methacrylic ester with a vinyl monomer containing a crosslinking group.

Said alkyl esters and alkoxyalkyl esters mentioned above can also be used as a monomer of (B) component. Other monomers which can be used in the (B) component are aryl acrylate such as phenyl acrylate or the like, aryloxyalkyl acrylate such as phenoxyethyl acrylate or the like, cycloalkyl acrylate such as cyclohexyl acrylate or the like, or methacrylates corresponding to the above mentioned acrylic monomers. On the other hand, the vinyl monomer containing a crosslinking group which can be used in the (B) component is similar to that used for copolymerization for producing the aqueous latex of the (A) component. Further, other vinyl monomers or olefin monomers can also be copolymerized, as is shown in the (A) component.

These acrylic esters and methacrylic esters are used for copolymerization reaction in the ratio of about 60–99 percent by weight, preferably about 70–99 percent by weight based on the total weight of monomers in the copolymer, the vinyl monomer containing crosslinking group in the ratio of about 0.1–10 percent by weight based on the total weight of monomers in the copolymer, preferably about 0.2–5 percent by weight, and other vinyl monomers or olefin monomers in the ratio of not more than about 40 percent by weight based on the total weight of monomers in the copolymer, preferably about 0.5–30 percent by weight, respectively. The aqueous latex of the (B) component—prepared by the same method for production of the aqueous latex of the (A) component—is copolymerized in a polymerization conversion ratio of about 90% or higher, preferably about 95–99.8%; the monomer ratio of respective supplied monomers almost simply corresponds to the composition ratio of the copolymer.

Polyfunctional unsaturated monomers can also be used in the copolymer in a ratio of about 0.05–30 percent by weight based on the total amount of monomer in the copolymer, preferably about 0.05–10 percent by weight, to make a three-dimensional crosslinked structure in acrylic and methacrylic polymers. Such polyfunctional unsaturated monomers are exemplified by ethylene glycol diacrylate, allylacrylate, bis-phenol A diacrylate, 1,4-butane diol diacrylate, neopentyl glycol diacrylate, pentaerythritol triacrylate, pentaerythritol tetraacrylate, or methacrylate corresponding to these compounds, tris (methacryloxyethyl) isocyanurate, divinyl benzene or the like.

The thus obtained aqueous latex of the (B) component contains a copolymer showing a solid concentration of about 25–50 percent by weight based on the total amount of aqueous latex and a glass transition temperature Tg or a softening point of not less than about 0° C., preferably not less than about 5° C.

Such copolymer can be arbitrarily prepared by adjusting the ratio of the monomers in the copolymer, as described in the (A) component. The Tg of a copolymer obtained can be predicted by calculation based on Tg values of individual homopolymer and their ratios of monomer in copolymer. Substantially, copolymers made of methacrylic esters and vinyl monomer containing crosslinking group, or a combination of a methacrylic ester, an acrylic ester and a vinyl monomer containing crosslinking group are preferably used. Methacrylic ester can also be copolymerized if the designated Tg can be secured.

The aqueous emulsion of the (A) component and (B) component respectively obtained by these methods are mixed in the ratio of about 30–98 percent by weight of the aqueous emulsion of the (A) component based on the total weight of aqueous emulsion of the (A) and (B) component, preferably about 40–95 percent by weight. And about 70–2 percent by weight of the aqueous emulsion of the (B) component based on the total amount of the aqueous emulsion of the (A) and (B) component, preferably about 60–5 percent by weight are mixed with the aqueous emulsion of the (B) component. After the aqueous emulsion of the (A) and (B) component are mixed, then the mixed aqueous emulsion is co-precipitated. When the mixing ratio of the aqueous emulsion of the (A) component and (B) component is outside of the above mentioned range, the blend composition of acrylic and/or methacrylic polymer does not show a reinforcing effect or sufficient rubbery properties.

Inorganic salts such as calcium chloride, sodium chloride, aluminum sulfate or the like, or organic poor solvents such as methanol, ethanol or the like can be used as a co-precipitation agent. The surfactant in respective aqueous latex should not always be the same kind. When the same kind of surfactants are, however, used in both aqueous latices, co-precipitation of the mixed solution can be easily achieved.

The blend composition of acrylic and/or methacrylic polymer obtained by co-precipitation, washing, and drying shows about 25 or higher, preferably about 30–150 of Mooney viscosity of $ML_{1+4}$ (100° C.). The Mooney viscosity not more than these ranges causes a higher adhesiveness and a poorly improved mechanical characteristics of the composition.

The acrylic and/or methacrylic polymer (B) has a high Tg or high softening point and is relatively hard, and in some cases the copolymer (B) is three-dimensionally crosslinked in itself. Therefore, the polymer B has a nature of little or no adhesiveness or aggregation. As the blend composition is obtained by co-precipitation from finely dispersed particles of component (A) and component (B), so sea-island micro structure is easily formed in the blend composition. B component forms island phase having the domain size of about 5–2000 nm in diameter, preferably about 10–1000 nm. When the domain size of the island phase becomes larger than this size, total contact surface between (A) component and (B) component becomes smaller to result in an insufficient reinforcing effect.

In the thus obtained blend composition of acrylic and/or methacrylic polymer blend composition, a crosslinking agent for a crosslinking group, a reinforcing filler such as carbon black and silica or the like, a filler such as graphite, diatomite, clay, talc, magnesium carbonate or the like, an antioxidant, an acid acceptor, and a lubricant or the like are added, if necessary, and followed by kneading for mixing and curing. Curing is carried out by press curing at about 100–250° C. of temperature for about 0.5–30 minutes, and oven curing (secondary cure) is carried out at about 100–200° C. of temperature for about 0.5–30 hours, if necessary.

Effect of the Invention

As for the structure of a monomer, it has been known that a monomer, for example, ethylacrylate which has a shorter side chain than that of n-butylacrylate gives a polymer having excellent mechanical properties, superior to that of n-butylacrylate. On the contrary, a shorter length of side chains causes deterioration in low temperature characteristics.

The blend composition of acrylic and/or methacrylic polymer according to the present invention, differing from IPN (interpenetrating polymer network) structure (a structure in which respective blended polymers forms a matrix), has a sea-island structure. These sea-island structure can be easily formed, in the present invention, by simply blending respective aqueous latices and then followed by co-precipitation. One of the components to be blended has, in some cases, been three-dimensionally crosslinked so that the crosslinked components can be easily dispersed in the blend composition.

Moreover, the process of blending of the present invention can be carried out under at a relatively low temperature so that aggregation of the dispersing polymer can be effectively prevented. On the contrary a conventional process of melt blending is usually blended at somewhat high temperature so that aggregation of the dispersing polymer tend to be occurred. Further, in a rubber blend composition of the present invention, the dispersing copolymer can be crosslinked with crosslinking agent so that there is little or no deterioration in the compression permanent set that is a common defect of conventional blending materials.

Japanese Patent Laid-Open No. 1990-300203 and No. 1990-300204 disclose a method for producing crosslinked microgel. This prior art relates to an improvement in mechanical properties of a blend composition by using a surface grafting reaction between resin matrix and vinyl group containing microgel dispersed in the resin matrix. The object of this prior art is to provide transparent resin materials which contain crosslinked microgel dispersed in the transparent resin. Therefore, in this prior art, a dissolving or melting process is essential for dispersing the crosslinked microgel into the transparent resin. No consideration has been made for stability of dispersion in this prior art. Besides, the wetting property (interaction) at the interface between the resin and microgel is not so good, and reinforcement is not fully considered in this prior art.

In the method of the present invention, there is almost no problem about dispersion stability of the blend composition, because blending in the present invention is a mixing process using the same kind of aqueous latices of emulsion polymerized or suspension polymerized acrylic type polymers. In the present invention the particle size of each component in the aqueous latices is in the range of about 5–2000 nm, preferably about 10–1000 nm in diameter, and the amount of emulsifier which is used in the latices is not specifically restricted.

Furthermore, in the present invention, the same types of polymers are blended with each other so that not only chemical bonding at the interface between the two polymers can be achieved easily, but also there are good advantages such as dispersability or surface interactivity (wettability) at the interface between the two polymers. Especially, even if there is no chemical bonding such as an interface grafting reaction between the dispersed polymer and matrix polymer, interaction between the ester group of the two acrylic type polymers provides a good reinforcing effect in the blend polymer composition.

Also furthermore, the method according to the present invention is characterized by that a material having a certain glass transition temperature (or a softening point) can be selected as an acrylic and/or methacrylic polymer to be blended. In this invention, as the first acrylic type polymer (A) to become a matrix phase (sea phase), those having a range of glass transition temperature Tg of about −10—−65° C., preferably about −20—−60° C. are usually selected. Such matrix phase having low temperature characteristics is usually used in order to obtain a composition having low temperature characteristics satisfactory as a rubber material.

On the other hand, as the second acrylic type polymer (B), those having Tg or softening point of about 0° C. or more, preferably about 5° C. or more are usually selected. A satisfactory mechanical characteristic of the blend composition is achieved by using a polymer (B) having a higher Tg or a higher softening point than that of the first polymer (A). This means that excellent mechanical characteristics of the blend composition can be secured by using the polymer (B) having a higher elastic modulus and having a stronger interaction with the polymer (A) which is a matrix polymer in the blend composition.

Therefore, the second polymer (B) should be dispersed as the island phase in the matrix of the first polymer (A). The second polymer (B) does not impose a negative effect on the low temperature characteristics, because the polymer (B), which is higher in hardness than that of the polymer (A), resides in the blend composition as an island-phase.

This means that satisfactorily higher mechanical characteristics and low temperature characteristics of the present blend composition are simultaneously attainable by forming the sea-island structure in the blend composition through blending two kinds of aqueous latices of acrylic type polymers having such temperature characteristics.

The blend composition of the acrylic type polymers of the present invention shows an excellent mechanical characteristics and low temperature characteristics, and is effectively used not only for various sealing materials such as oil seals, o-rings, packings, gas seal materials or the like, but also for cured molding materials such as hoses or the like. The blend composition of the present invention has an excellent abrasion resistance especially when used as an oil seals.

EXAMPLES

Examples of the present invention will be described as below. The scope of the invention should not be restricted to those examples.

Example 1

| (1) latex A1 | |
|---|---|
| n-butyl acrylate | 928 g |
| 2-methoxyethyl acrylate | 640 g |
| chloroacetic acid | 32 g |
| sodium lauryl sulfate | 50 g |
| lauryl mercaptan | 0.16 g |
| water | 3 litter |

The mixture having above respective components was fully stirred to be substituted by nitrogen gas, the temperature was raised up to 50° C., 0.3 g of each of sodium hydrogen sulfite and ammonium persulfate was added to start polymerization. The polymerization reaction was continued for about 2 hours to yield an aqueous latex A1 in a 96% conversion polymerization ratio. The average particle size of the latex was measured as about 50 nm in diameter by a light scattering type particle size distribution counter. The glass transition temperature Tg of the thus obtained copolymer was −45° C., which was measured by using a Differential Scanning Calorimeter made by Perkin-Elmer under temperature rising speed of 10° C./min.

| (2) latex B1 | |
|---|---|
| Ethyl acrylate | 253 g |
| methyl methacrylate | 267 g |
| chloroacetic acid | 11 g |
| diethylene glycol dimethacrylate | 3 g |
| sodium lauryl sulfate | 20 g |
| lauryl mercaptan | 0.06 g |
| water | 1 litter |

The mixture having above respective components was fully stirred to be substituted by nitrogen gas, the temperature was raised up to 60° C., 0.1 g of each of sodium hydrogen sulfite and ammonium persulfate was added to start polymerization. The polymerization reaction was continued for about 2 hours to yield an aqueous latex B1 in a 98% conversion polymerization ratio. The average particle size of the latex was measured as about 50 nm in diameter by a light scattering type particle size distribution counter. The glass transition temperature Tg of the thus obtained copolymer was measured 50° C., which was measured by using a Differential Scanning Calorimeter made by Perkin-Elmer under temperature rising speed of 10° C./min.

(3) The aqueous latices A1 and B1 were fully mixed in the weight ratio of about 75/25 by stirring, and the mixture of 5.5 liters was gradually poured into 10 liters of methanol to co-precipitate. Supernatant layer was removed, and 5 liters of methanol/water (volumetric proportion 1:2) mixture solution were added; the co-precipitated product was washed three times and dried to yield the compound.

The thus obtained blend composition of the acrylic polymer 1 was molded into a sheet with a thickness of 2 mm by using a vacuum press at 190° C., then treated to smooth its surface by using an ultramicrotome, and then surface analysis was carried out by using an inter atomic force microscope (made by Toyo Technica, Tapping method, phase contrast detection). As a result, it was known that the B1 component having higher hardness than that of the A1 component had an average domain size of about 50–100 nm in diameter and was evenly dispersed in the matrix of A1 component. The Mooney viscosity. ($ML_{1+4}$, 100° C.) of the composition was 39.

(4)

| acrylic type polymer blend composition 1 | 100 | (phr) |
|---|---|---|
| HAF carbon black | 40 | phr |
| stearic acid | 1 | phr |
| antioxidant (Ouchi Sinko Kagaku Yakuhin: Nocrac CD) | 2 | phr |
| sulfur | 0.2 | phr |
| sodium stearate | 2 | phr |
| potassium stearate | 0.25 | phr | phr: parts per hundred rubber

Above respective components were kneaded to mix by using an open roll mill, the kneaded product obtained was cured by a press vulcanizer at 180° C. for 8 minutes to mold a rubber sheet with a thickness of 2 mm, and then cured in an oven at 175° C. for 4 hours (secondary cure). The rubber sheet was then measured for ordinary physical properties, compression permanent set (based on JIS K-6301), and $TR_{10}$ value (by a TR tester.)

Example 2

(1) Latex B2 Aqueous latex B2 in the 98% conversion ratio of polymerization was obtained without using diethylene glycol dimethacrylate in the Example 1 (2) of the aqueous latex B1. Average particle size of the latex was about 50 nm in diameter and glass transition temperature Tg of the component B2 was 50° C.

(2) The aqueous latices A1 and B2 were mixed, as is shown in the Example 1 (3), in the weight ratio of about 80/20 to yield blend composition II of acrylic polymer. As a result of the surface analysis using the inter atomic force microscope, it was known that the B2 component with higher hardness than that of the A1 component had an average domain size of about 50–100 nm in diameter and was evenly dispersed in the matrix of A1 component. The Mooney viscosity ($ML_{1+4}$, 100° C.) of the composition II was 36.

(3) Kneading (the amount of HAF carbon black was changed to 45 phr), curing, and measurement were carried out on the blend composition II of the acrylic polymer, as the same method as those of the Example 1 (4).

Example 3

(1) Latex B3 In the production of the aqueous latex B1 of the Example 1 (2), phenyl methacrylate was used instead of ethyl acrylate in the same quantity and divinyl benzene was used instead of diethylene glycol dimethacrylate in the same quantity. Aqueous latex B3 was obtained in the 92% conversion ratio of polymerization. The reaction temperature was raised up to 90° C. at about 1 hour after the start of the reaction. The average particle size of the latex was about 120 nm in diameter and Tg of the component B3 was 110° C.

(2) The aqueous latices A1 and B3 were mixed in a weight proportion of about 80/20 followed by gradual pouring of the mixture solution (5.5 liters) into an aqueous solution of 5 liters containing 5 percent by weight of calcium chloride to yield the blend composition III of the acrylic polymer, by the same method as that of the Example 1 (3). As a result of the surface analysis using the inter atomic force microscope, it was known that the B3 component having higher hardness than that of component A1 has an average domain size of about 150–200 nm in diameter and was evenly dispersed in the matrix of A1 component. The Mooney viscosity ($ML_{1+4}$, 100° C.) of the compound III was 68.

(3) Kneading (the amount of HAF carbon black was changed to 35 phr), curing, and measurements were carried out in the same way as those of Example 1 (4).

Example 4

(1) Latex A2 In the production of the aqueous latex A1 of the Example 1 (1), ethyl acrylate was used instead of 2-methoxy ethyl acrylate in the same quantity and glycidyl methacrylate was used instead of vinyl chloroacetate in the same quantity. Aqueous latex A2 was obtained in the 90% conversion ratio of polymerization. The average particle size of the latex was about 70 nm in diameter and Tg of the polymer was −34° C.

| Latex B4 | |
|---|---|
| Ethyl acrylate | 80 g |
| methyl methacrylate | 440 g |
| glycidyl methacrylate | 10 g |
| sodium lauryl sulfate | 20 g |
| lauryl mercaptan | 0.06 g |
| water | 1 litter |

Aqueous latex B4 in 98% polymerization conversion ratio was obtained using above respective components by the same copolymerization procedures as that of the Example 3 (1). The average particle size of the latex was about 100 nm in diameter and Tg of the polymer was 74° C.

(3) The aqueous latices A2 and B4 were mixed in a weight proportion of about 60/40 to yield the blend composition IV of the acrylic polymer by the same method as that of the Example 1 (3). As a result of the surface analysis using the inter atomic force microscope, it was known that the B4 component with higher hardness than that of the A2 component had an average domain size of about 100–150 nm in diameter and was evenly dispersed in the matrix of A2 component. The Mooney viscosity ($ML_{1+4}$, 100° C.) of the compound IV was 55.

(4) Kneading (2 phr of zinc dimethyldithiocarbamate and 0.5 phr of ferric dimethyldithiocarbamate were used instead of sulfur, sodium stearate and potassium stearate), curing, and measurements were carried out by the same method as those of Example 1 (4).

Comparative Example 1

Using acrylic polymer obtained from the aqueous latex A1 of Example 1, kneading (the amount of HAF carbon black was changed to 60 phr), curing, and measurements were carried out in the same way as those of the Example 1 (4).

Comparative Example 2

(1) In the production of the aqueous latex B1 of the Example 2, the amount of ethyl acrylate was changed to 430 g and the amount of methyl methacrylate was changed to 90 g, respectively. Aqueous latex B5 was obtained. Tg of the polymer B5 was −5° C.

(2) The aqueous latices A1 and B5 were mixed in a weight proportion of about 75/25 to yield blend composition V of the acrylic polymer by the same method as that of the Example 1 (3). As a result of the surface analysis using the inter atomic force microscope, it was known that the B5 component with higher hardness than that of component A1 and was evenly dispersed in the matrix of A1 component. The Mooney viscosity ($ML_{1+4}$, 100° C.) of the blend composition V was 28.

(3) Kneading (the amount of HAF carbon black was changed to 55 phr, curing, and measurements were carried out by using the blend composition V of the acrylic polymer, as using the same method as those of the Example 1 (4).

Comparative Example 3

(1) The A1 and B2 components obtained from aqueous latex used in Example 2 were dissolved and stirred in methylethyl ketone in a weight ratio of about 80/20 followed by removal of solvent by distillation to yield a blend composition VI of the acrylic polymer. As a result of surface analysis using the inter atomic force microscope, it was known that a random structure of A1 and B2 was seen in the composition VI and there were also aggregated particles having sizes of 2 μm or over. The Mooney viscosity ($ML_{1+4}$, 100° C.) of the composition was 37.

(2) Kneading (the amount of HAF carbon black was changed to 45 phr), curing, and measurements were carried out by the same method as those of the Example 1 (4).

The results obtained from aforementioned respective Examples and Comparative Examples are shown in the following Tables 1 and 2.

TABLE 1

| | | Example | | | |
|---|---|---|---|---|---|
| | | 1 | 2 | 3 | 4 |
| Ordinary physical properties | Tensile strength (MPa) | 14.6 | 15.1 | 15.4 | 15.3 |
| | Elongation (%) | 270 | 290 | 280 | 240 |
| | Tearing strength (KN/m) | 36 | 32 | 34 | 38 |
| Compression | 150° C., | 25 | 24 | 26 | 20 |

TABLE 1-continued

|  |  | Example | | | |
|---|---|---|---|---|---|
|  |  | 1 | 2 | 3 | 4 |
| permanent set | 70 hours 25% compression: (%) | | | | |
| $TR_{10}$ | (° C.) | −33 | −33 | −34 | −25 |

TABLE 2

|  |  | Comparative Example | | |
|---|---|---|---|---|
|  |  | 1 | 2 | 3 |
| Ordinary physical properties | Tensile strength (MPa) | 14.0 | 14.4 | 14.5 |
|  | Elongation (%) | 230 | 250 | 240 |
|  | Tearing strength (KN/m) | 18 | 24 | 26 |
| Compression permanent set | 150° C., 70 hours 25% compression: (%) | 30 | 27 | 28 |
| $TR_{10}$ | (° C.) | −35 | −16 | −12 |

What is claimed is:

1. A mold-cured composition comprising:
   a) a first acrylic and/or methacrylic copolymer having a glass transition temperature or a softening point of about −10 to −65° C. and a crosslinked group therein,
   b) a second acrylic and/or methacrylic copolymer having a glass transition temperature or a softening point not less than 0° C. and a crosslinked group therein,
   c) a crosslinking agent crosslinked to the crosslined group of each of the first and second copolymers, and
   d) a filler dispersed in at least one of said first and second copolymers,
wherein the second copolymer is in the form of an island phase in a continuous matrix phase of the first copolymer.

2. The mold-cured composition according to claim 1, wherein a composite of (a) and (b) is that of a washed and dried co-precipitate of an aqueous emulsion or suspension of each of (a) and (b).

3. The mold-cured composition according to claim 2, wherein the aqueous emulsion or suspension is that of an emulsion polymerization or a suspension polymerization, respectively.

4. The mold-cured composition according to claim 1, wherein each of the first and second copolymers is that of at least one monomer selected from the group consisting of an acrylic ester and a methacrylic ester.

5. The mold-cured composition according to claim 1, wherein said first copolymer is that of at least one monomer selected from the group consisting of ethyl acrylate, n-butyl acrylate and 2-methoxyethylacrylate.

6. The mold-cured composition according to claim 1, wherein at least about 30 percent by weight, based on the total amount of monomer composition in said first copolymer, is that of at least one monomer selected from the group consisting of ethyl acrylate and n-butyal acrylate.

7. The mold-cured composition according to claim 1, wherein about 60 to 99 present by weight, based on the total amount of monomer composition in said second copolymer, is that of a methacrylic ester.

8. The mold-cured composition according to claim 7, wherein said second copolymer is also that of a polyfunctional unsaturated monomer.

9. The mold-cured composition according to claim 1, wherein the filler is a reinforcing filler.

10. The mold-cured composition according to claim 1 in the form of a sealing product.

11. The mold-cured composition according to claim 10, wherein the sealing product is an o-ring.

12. The mold-cured composition according to claim 10, wherein the sealing product is an oil seal.

13. The mold-cured composition according to claim 10, wherein the sealing product is packing.

14. The mold-cured composition according to claim 1, wherein said composition is in sheet form.

15. The mold-cured composition according to claim 1, wherein said composition is in the form of a hose.

16. A mold-cured composition comprising:
   a) a first acrylic and/or methacrylic copolymer having a glass transition temperature or a softening point of about −10 to −65° C. and a crosslinked group therein,
   b) a second acrylic and/or methacrylic copolymer having a glass transition temperature or a softening point not less than 0° C. and a crosslinked group therein,
   c) a crosslinking agent crosslinked to the crosslined group of each of the first and second copolymers, and
   d) a filler dispersed in at least one of said first and second copolymers;
wherein the second copolymer is in the form of an island phase having a domain size of about 5 to 2000 nm.

17. The mold-cured composition according to claim 16, wherein (a) and (b) are in the form of a washed and dried co-precipitate of an aqueous emulsion or suspension of (a) and (b).

18. The mold-cured composition according to claim 1, the sole essential polymeric components of which are (a) and (b).

19. The mold-cured composition according to claim 2, the sole essential polymeric components of which are (a) and (b).

20. The mold-cured composition according to claim 16, the sole essential polymeric components of which are (a) and (b).

* * * * *